United States Patent [19]

Izawa et al.

[11] Patent Number: 5,247,361
[45] Date of Patent: Sep. 21, 1993

[54] OUTLINE ENCHANCING DEVICE

[75] Inventors: Yosuke Izawa, Ibaraki; Naoji Okumura, Mino, both of Japan

[73] Assignee: Matsushita Electric Industrial Co., Ltd., Osaka, Japan

[21] Appl. No.: 857,238

[22] Filed: Mar. 25, 1992

[30] Foreign Application Priority Data

Mar. 26, 1991 [JP] Japan .................... 3-61618

[51] Int. Cl.$^5$ ............................. H04N 5/14
[52] U.S. Cl. ................................. 358/166
[58] Field of Search ............... 358/166, 162, 37

[56] References Cited

U.S. PATENT DOCUMENTS

| | | | |
|---|---|---|---|
| 4,758,891 | 7/1988 | Hitchcock et al. | 358/166 |
| 4,912,551 | 3/1990 | Ozaki | 358/166 |
| 5,151,787 | 9/1992 | Park | 358/166 X |

*Primary Examiner*—Victor R. Kostak
*Attorney, Agent, or Firm*—Ratner & Prestia

[57] ABSTRACT

An outline enhancing device for enhancing an outline of an image formed by a video signal having a rising and falling slope portions and a flat portion includes an enhancing signal producing circuit for producing an enhancing signal having a first, a second, and a third enhancing waveforms which wavelengths are the same as those of three portions of the video signal, respectively. A delay circuit is provided for delaying the video signal to be synchronized with the enhancing signal. A subtracter is further provided for subtracting the enhancing signal from the synchronized video signal such that three enhancing wavesforms are exactly superimposed on the rising slope, the falling slope and the flat portions, respectively, without any interference to the neighboring slopes or portion. As a result of such subtraction, the gradients of the rising and falling slopes are made large while the flat portion is extended. Thus, the outline in the video signal is enhanced without preshoots or overshoots around the outline.

4 Claims, 5 Drawing Sheets

5,247,361

OUTLINE ENCHANCING DEVICE

BACKGROUND OF THE INVENTION

1. Field of the Invention

The present invention relates to a visual image reproducing device for use such as in a television receiver, a videotape recorder or a video projector and, more particularly, to an outline enhancing device which can be used to enhance the outline of a video image for a sharper image reproduction.

2. Description of the Prior Art

As demands for the quality of image reproduced by television has increased in recent years, the outline enhancing devices have become increasingly important as a means for sharpening the image reproduced on the CRT screen by enhancing the rising and falling slopes of video signal.

One type of such device is a described below with reference to the accompanying figures.

FIGS. 3 and 4 are, respectively, a block diagram and a graph showing the input/output relationship in an example of a conventional outline enhancing device. As shown in Fig. 3, the outline enhancing device OCp includes a differentiating circuit 10 which differentiates a video signal S1 for producing a first differentiated video Signal S2 '; a delay circuit 20 which delays the first differentiated video signal S2' for producing a first delayed differentiated signal S3'; a positive half-wave rectifying circuit 30 which rectifies the first differentiated video signal S2' for producing a positive first differentiated signal S4' by passing the positive element thereof only; a negative half-wave rectifying circuit 40 which rectifies the first differentiated video signal S2' for producing a negative first differentiated signal S5' by passing only the negative element thereof; a positive half-wave rectifying circuit 50 which rectifies the first delayed differentiated signal S3' for producing a positive first delayed differentiated signal S6' by passing only the positive element thereof; a negative half-wave rectifying circuit 60 which rectifies the first delayed differentiated signal S3' for producing a negative first delayed differentiated signal S7' by passing only the negative elements thereof; a multiplier 70 which produces a multiplied positive first differentiated signal S8' from the positive first differentiated signal S4' and the positive first delayed differentiated signal S6'; a multiplier 80 which produces a multiplied negative first differentiated signal S9' from the negative first differentiated signal S5' and negative first delayed differentiated signal S7'; a subtracter 90 which produces a multiplied first differentiated signal S10' by subtracting the multiplied negative first differentiated signal S9' from the multiplied positive first differentiated signal S8'; a differentiated circuit 100 which differentiates multiplied first differentiated signal S10' for producing a second differentiated signal S11'; a delay circuit 110 which delays the video signal S1 for producing a delayed video signal S12'; and a subtracter 120 which produces an outline enhanced signal S13' by subtracting the second differentiated signal S11' from the delayed video signal S12.'

A outline enhancing device thus constructed operates as described below, with references to FIG. 4.

First, the video signal S1 has a wave form having a first portion A, a second portion B and a third portion C such that it rises for a predetermined period Ta in the first portion A, stays at the risen level for a predetermined period Tb in the second portion, and goes down to zero level for a predetermined period Tc in the third portion C.

The differentiating circuit 10 differentiates video signal S1 and produces the first differentiated video signal S2'. The delay circuit 20 delays the first differentiated video signal S2' and thereby produces the first delayed differentiated signal S3'. Each of thus produced first differentiated video signal S2' and first delayed differentiated signal S3' is both divided into a positive and a negative signals such as signals S6', S4', S7, and S5', respectively, through the half-wave rectifying circuits 50, 60, 30, and 40. The positive signals S6' and S4' are multiplied to produce the multiplied positive first differentiated signal S8' by the multiplier 70. The negative signals S7' and S5' are also multiplied to produce the multiplied negative first differentiated signal S9'. Thus produced multiplied positive and negative signals S8' and S9' are converted to the multiplied first differentiated signal S10' which is in the form of a first differentiated signal. This first differentiated signal S10' is further differentiated by the differentiating circuit 10 to produce the second differentiated signal S11'. The second differentiated signal S11' is used to subtract from the delayed video signal S12' to produce the outline enhanced signal S13'. The second differentiated signal S11' has three portions Ap, Bp, and Cp having lengths of ap, bp, and cp, respectively, as shown in FIG. 4. Each of the first and third portion Ap and Bp includes both of positive and negative peaks PS' and OS'. Since the delayed video signal S12' is the same as the video signal S1 being delayed by the delay circuit 110 so as to synchronize with the second differentiated signal S11'. Since these portions ap and cp having positive and negative peaks PS' and OS' is used to enhance the gradients of the rising and falling slopes of the delayed video signal S12', thus obtained outline enhanced signal S13' has the steeper slopes when compared with the original video signal S1, resulting the sharpened outline of video image.

However, the outline enhancing device OCp does not include any means to secure that ap and cp equals to Ta and Tc of the video signal S1, respectively. Therefore, the lengths ap and cp may be any value greater or smaller than Ta and Tc. In such case, when these portions of ap, bp and cp invades neighboring area of the corresponding portions A, B, and B of the delayed video signal S12', respectively. The peaks PS' and OS' of the second differentiated signal S1140 cause preshoots PS and overshoots OS near the rising and falling slopes of the outline enhanced signal S13' as shown. Since these preshoots PS and overshoots OS are also reproduced around the outline area of the original image on the CRT, the quality of reproduced image of outline enhanced signal S13' is degraded.

SUMMARY OF THE INVENTION

The present invention has been developed with a view to substantially solving the above described disadvantages and has for its essential object to provide an improved outline enhancing device.

In order to achieve the aforementioned objective, an outline enhancing device for enhancing an outline of an image formed by a video signal having a first and second slopes and a flat portion between the first and second slope portions, the first and second slope portions and the flat portion have a first and second wave lengths and a third wave length, comprises an enhancing signal producing means for producing an enhancing signal having a first and second enhancing portions and a plain portion between the first and second enhancing portions such that the first and second enhancing portions and plain portion have the same wave lengths as those of the first and second slope portions and the flat portion, respectively.

The outline enhancing device further comprises a synchronizing means for synchronizing the video signal with the enhancing signal and an enhancing means for enhancing an outline of the video signal by subtracting the enhancing signal from the video signal such that the first and second enhancing portions and the plain portion are exactly superimposed on the first and second slope portions the first and the flat portion, respectively, without interference to either of neighboring portions thereof and used for making the first and second slope portions steep.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
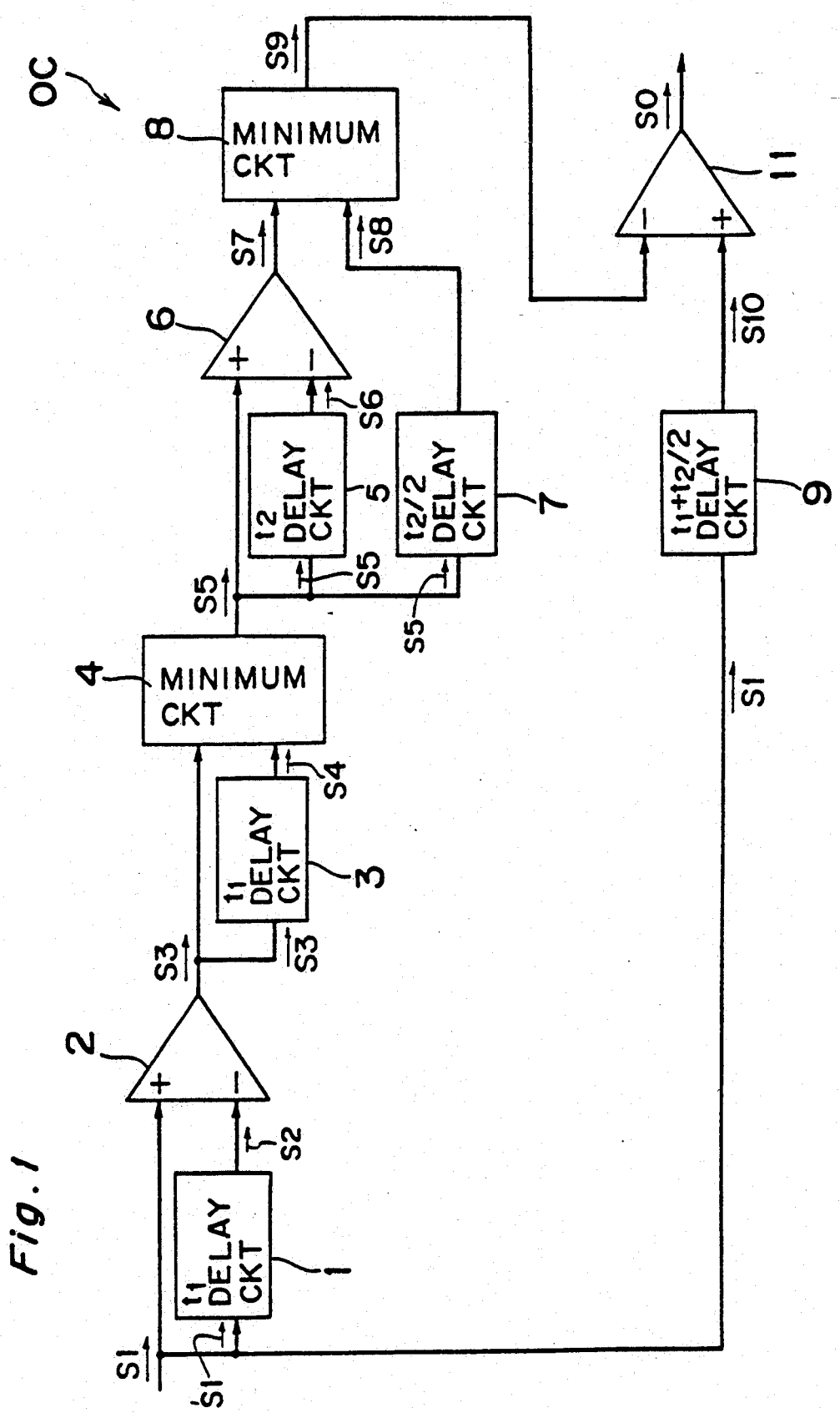
FIG. 1 is a block diagram of an outline enhancing device according to an preferred embodiment of the present invention.

Referring to FIG. 1, a block diagram of an outline enhancing device OC according to a preferred embodiment of the present invention is shown. The outline enhancing device OC receives a video signal S1 having a rising portion A extending for a period Ta, a plain portion B extending for a period Tb, and a falling portion C extending for a period Tc, as shown in FIG. 2, and enhances the outline image thereof. Referring back to FIG. 1, the outline enhancing device OC comprises a first delay circuit 1 which delays a video signal S1 and produces a delayed video signal S2. A first subtracter 2 subtracts the delayed video signal S2 from the video signal S1 and produces a primary differentiated signal S3. A second delay circuit 3 delays the primary differentiated signal S3 and produces a delayed primary differentiated signal S4. A first minimum circuit 4 synthesizes a minimum primary differentiated signal S5 on receipt of the primary differentiated signal S3 and the delayed primary differentiated signal S4 by successively combining either of them which is smaller than the other. A third delay circuit 5 delays the minimum primary differentiated signal S5 and produces a first delayed minimum primary differentiated signal S6. A second subtracter 6 subtracts the delayed minimum primary differentiated signal S6 from the minimum primary differentiated signal S5 and produces a second differentiated signal S7. A fourth delay circuit 7 delays the minimum primary differentiated signal S5 and produces a second delayed minimum primary differentiated signal S8. A second minimum circuit 8 synthesizes a correction signal S9 on receipt of the second delayed minimum primary differentiated signal S7 and the second delayed minimum primary differentiated signal S8. A fifth delay circuit 9 delays the video signal S1 on receipt of the signal P and produces a delayed video signal S10. A third subtracter 11 subtracts the correction signal S9 from the delayed video signal S10 and produces an output video signal SO.

Figure 2A:
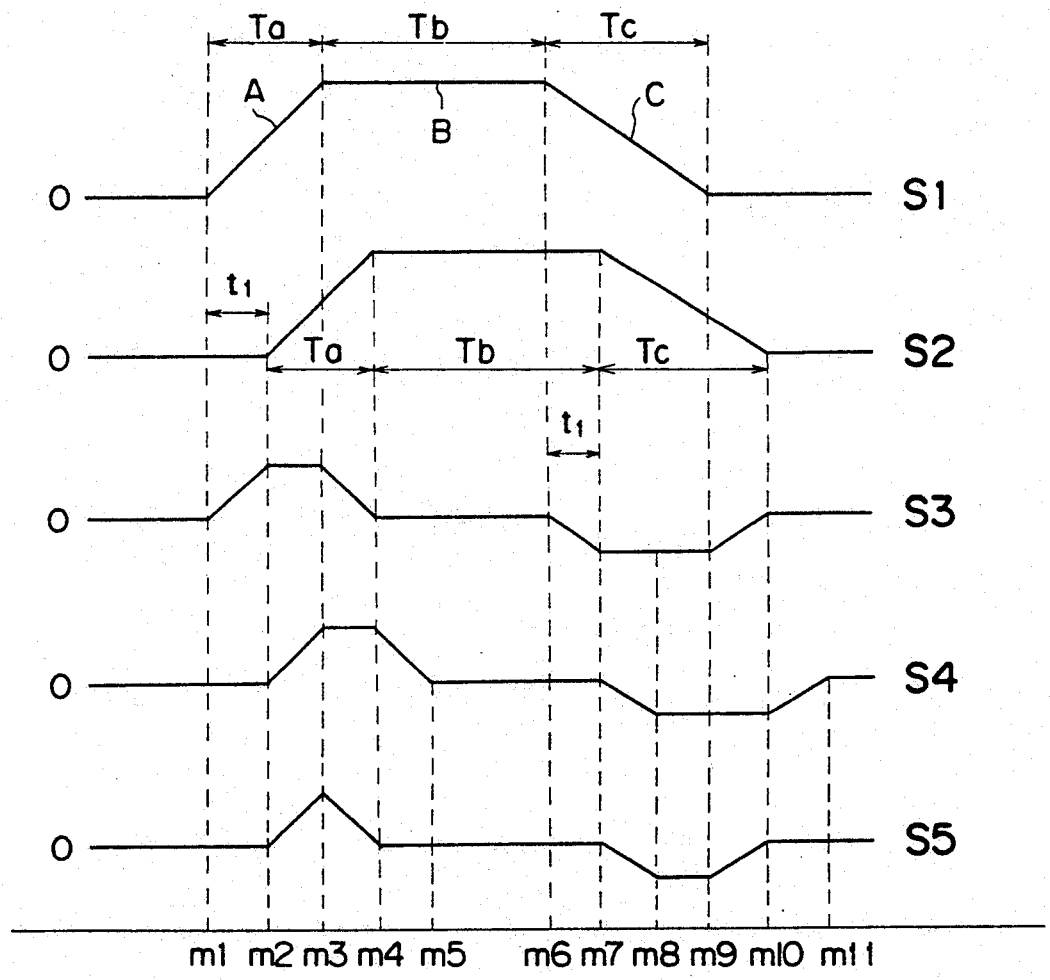
FIGS. 2a and 2b are graphs showing wave forms of signals observed at various places in the outline enhancing device shown in FIG. 1.
Figure 2B:
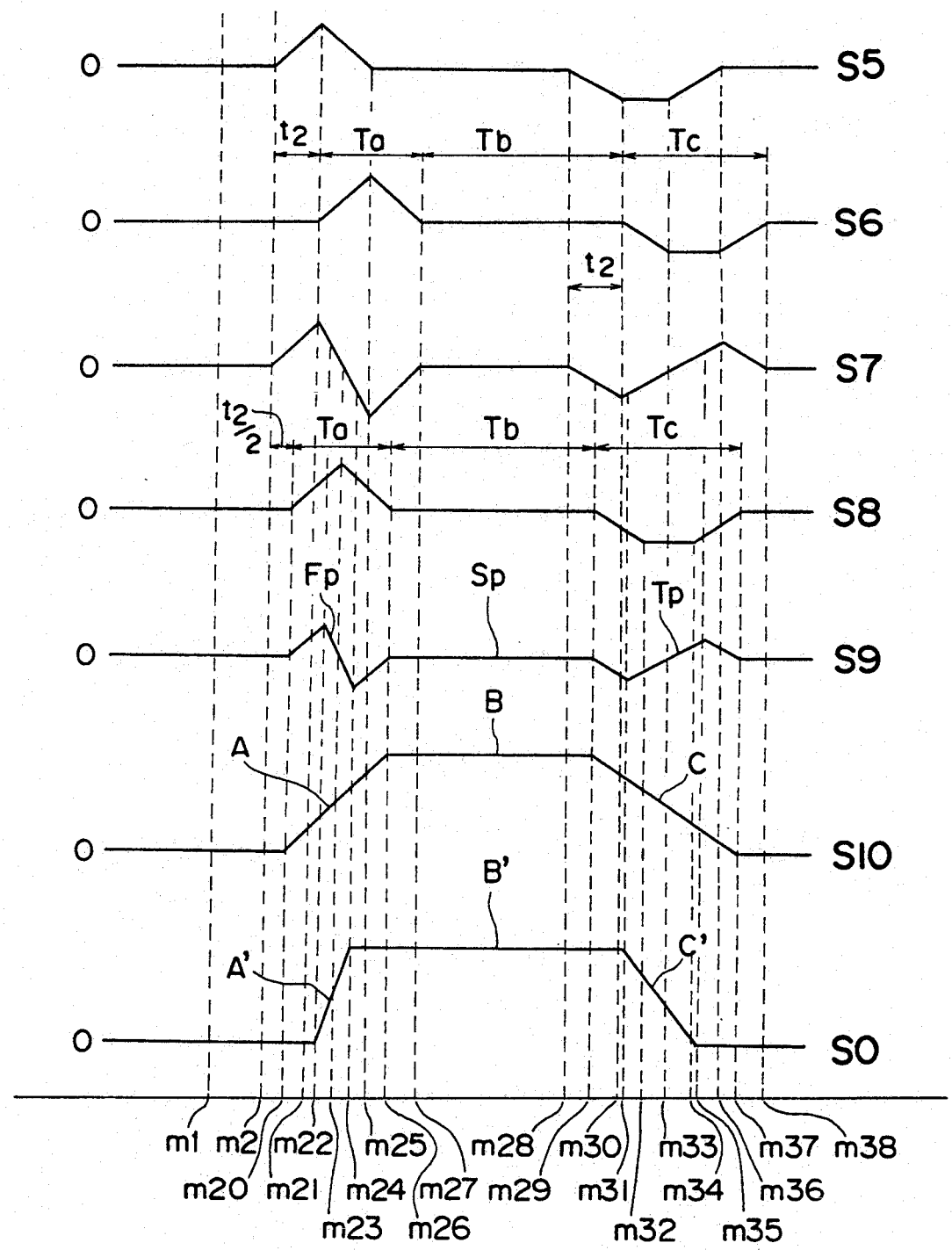
Figure 3:
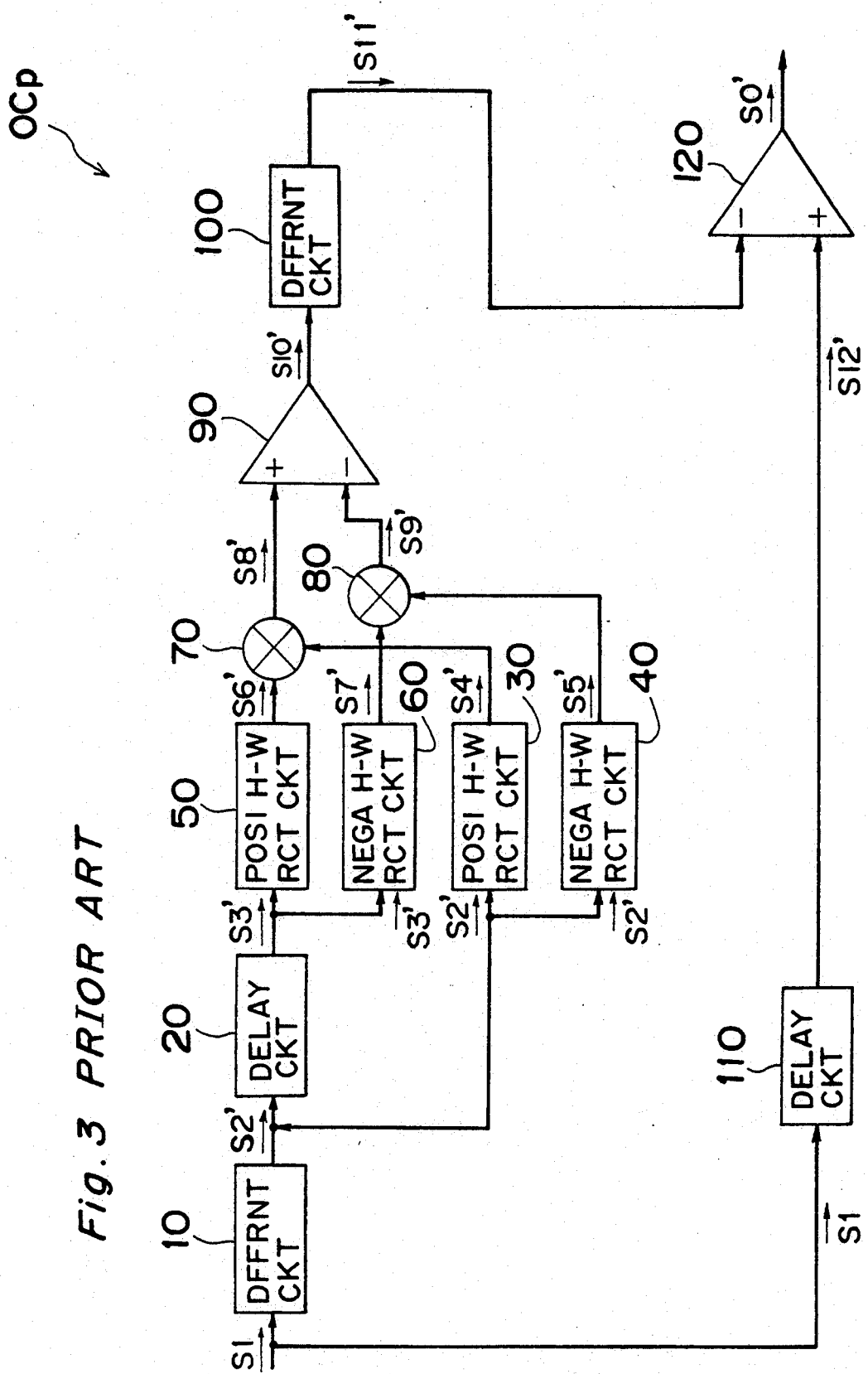
FIG. 3 is a block diagram of an example of a conventional outline enhancing device.
Figure 4:
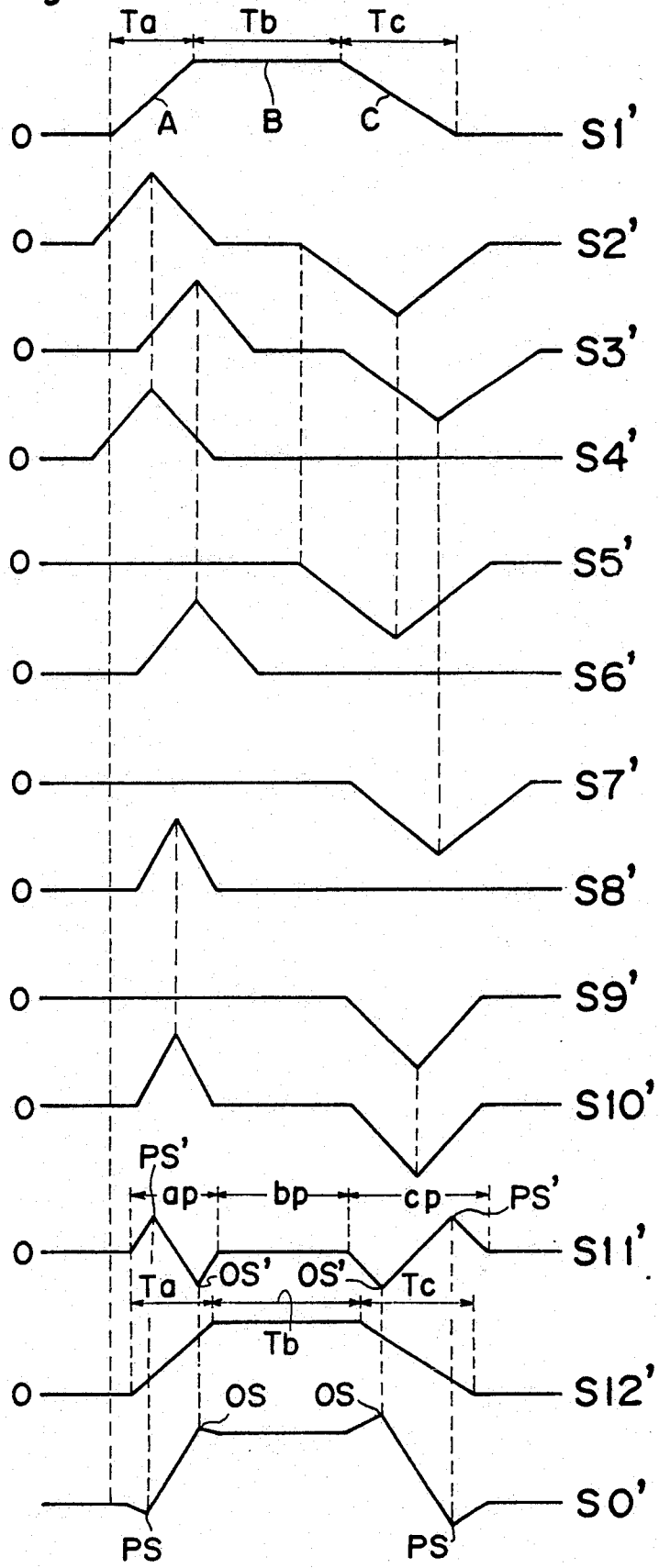
FIG. 4 is a graph showing wave forms of signals observed at various places in the outline enhancing device shown in FIG. 3.

Referring to FIGS. 2a and 2b, the operation of the outline correction device OC thus constructed is described below. An image of a white object placed in a black background is considered. A video signal of a line scanned across this image is shown in FIG. 2a, signal S1, wherein the rising portion A represents a left contour of the black object, the plain portion B represents a body of the black object and the falling portion C represents a right contour of the black body. The time periods in which the portion A, B, and C extend are indicated as Ta, Tb, and Tc, respectively. The video signal S1 has a waveform that it rises from time m1 to m3, stays at the level till time m6, then falls and returns to the zero at time m9. Although the video signal S1 is shown as a positive going signal in this embodiment, the present invention is applicable also to a negative going signal.

The first delay circuit 1 delays the video signal S1 by a first delay period t1 which is a predetermined value optionally selected to satisfy the following equation.

$$0 < t1 < Ta + Tb + Tc.$$

Then, the circuit 1 produces the delayed video signal S2 having such a wave form that it rises from time m2 to m4, then stays at the level till time m7, then falls and returns to the zero at time m10. The wave form of the delayed video signal S2 is identical to that of the video signal S1 except that the phase is delayed by the period of t1.

The first subtracter 2 subtracts the delayed video signal S2 from the video signal S1 to produce the primary differentiated signal S3 as in a manner below.

From time m1 to m2 (t1)

Since the signal S1 rose at a first rate but the signal S2 is at the zero level, the signal S3 is the same as the signal S1.

From time m2 to m3 (Ta-t1)

Since both signals S1 and S2 rise at the first rate, the signal S3 stays at the risen level.

From time m3 to m4 (t1)

Since the signal S1 is plain but the signal S2 still rises at the first rate, the signal falls down to the zero level at reversed first rate.

From time m4 to m6 (Tb-t1)

Since the both signals S1 and S2 are plain, the signal S2 stays at the zero level.

From time m6 to m7 (t1)

Since the signal S1 falls at a second rate but the signal S2 still plain, the signal S3 falls down at the second rate.

From time m7 to m9 (Tc-t1)

Since both signals S1 and S2 falls at the second rate, the signal S3 stays at the fallen level.

From time m9 to m10 (t1)

Since the signal S1 is at the zero level but the signal S2 still falls at the second rate, the signal S3 rises at the reverse second rate and returns to the zero level.

After time m10

Since both signals S1 and S2 are at the zero level, the signal S3 is also at the zero level. Thus, the signal S3 represents a primary differentiation of the video signal S1.

The delay circuit 3 delays the primary differentiated signal S3 by the first delay period "t1" and produces the delayed primary differentiated signal S4. Therefore, the signal S4 has such a waveform that it rises from time m2 to m3 for the period t1, then stays at the level till time m4, falls down to the zero at time m5, stays the zero level until time m7, falls down till time m8, stays at the fallen level till time m10, and then returns to the zero level at time m11. The wave form of signal S4 is identical to that of the signal S3 except that the phase is delayed by "t1".

Then, the minimum circuit 4 produces the minimum primary differentiated signal S5 on receipt of the primary differentiated signal S3 and the delayed primary differentiated signal S4 in a manner described below. The minimum circuit 4 compares the amplitudes of two signals S3 and S4, and selects either amplitude which absolute value is smaller than the other as an amplitude of the signal S5 to be synthesized by combining such selected amplitude of signals S3 and S4. When the polarities of signal S3 and S4 are different from each other, zero amplitude in stead of the adopted signal is employed for the adopted amplitude. Synthesizing operation of the minimum circuit 4 is as follows.

From time m1 to m3

Since the signal S4 is smaller than the signal S4 but positive, the signal S4 is selected as the signal S5.

From time m3 to m6

Since the signal S3 is zero or smaller than the sinal S4, the signal S3 is selected as the signal S5.

From time m6 to m8

Since the signal S4 is zero or negative but is greater than the signal S3, the signal S4 is selected as the signal S5.

From time m8 to m9

Since the both signals S3 and S4 is the same, the signal S5 is the same as the signal S3 or S4.

From time m9 to m11

Since both signals S3 and S4 are negative but the absolute value of signal S3 is smaller than S4, the signal S3 is selected as the signal S5. Thus, the signal S5 has a positive going portion between time m2 and m4 for the period Ta and a negative going portion between time m7 and m10 for the period Tc.

The delay circuit 5 delays the minimum primary differentiated signal S5 by a predetermined period t2 and produces the first delayed minimum primary differentiated signal S6. It is to be noted that t2 is a predetermined value optionally selected to satisfy the following equation.

$$0 < t2/2 < t1$$

Then, the signal S6 has such a waveform that it rises from time m21 to m25, then falls down to the zero till time m27, stays at the zero till time m30, then falls till time m33, then stays at the fallen level till time m36, and returns to the zero at time m38. Therefore, the waveform of the signal S6 is identical to that of the signal S5 except that the phase is delayed by the period of t2.

The subtracter 6 subtracts the signal S6 from the signal S5 to produce the second differentiated signal S7.

From time m2 to m21 (t2)

Since the signal S6 is zero but the signal S5 is positive, the signal S7 is the same as the signal S5.

From time m21 to m25

Since both signals S5 falls down to the zero and S6 rises a positive peak point, the signal S7 falls down to the negative point which absolute value is the same as the positive peak point of the signal S6.

From time m25 to m28

Since the signal S5 is at the zero level, the signal S7 has the reversed waveform of the signal S6.

From time m29 to m30

Since the signal S5 falls down to the negative peak level but the signal S6 stays at the zero level, the signal S7 is the same as the signal S5.

From time m30 to m33

Since the signal S5 stays the negative peak till time m34 but the signal S6 falls down toward the negative peak point, the signal S7 linearly returns to the zero.

From time m33 to m36

Since signal S5 linearly returns to the zero but the signal S6 stays at the negative peak, the signal S7 linearly rises at the same gradient as before.

From time m36 to m38

Since the signal S5 stays at the zero but the signal S6 rises toward to the zero, the signal S7 linearly falls down to the zero. Thus, the signal S7 represents a second differentiation of the video signal S1. Thus, the signal S7 has a pulse length expressed by "t2+Ta+Tb+Tc" as it starts at time m2 and terminates at time m38.

The delay circuit 7 delays the minimum primary differentiated signal S5 by the predetermined period of t2/2 and produces the second delayed minimum primary differentiated signal S8. Therefore, the signal S8 has such a waveform that it rises toward the positive peak from time m20 to m23, then returns toward the zero till time m26, stays at the zero till time m29, falls down toward the negative peak till time m33, stays at the negative peak till time m34, and then returns toward the zero level till time m37. Thus, the waveform of signal S8 is identical to that of the signal S5 except that the phase is delayed by t2/2. It is to be noted that the signal S8 having a pulse length of "Ta+Tb+Tc" is evenly aligned with the signal S7 having the pulse length of "t2+Ta+Tb+Tc" such that the pulse of signal S8 starts t2/2 later and terminates t2/2 earlier than that of signal S7.

The minimum circuit 8 produces the correction signal S9 on receipt of the second differentiated signal S7 and second delayed minimum primary differentiated signal S8 in a manner similar to that of the minimum circuit 4. The minimum circuit 8 selects either amplitude of signals S7 and S8 which absolute value is smaller than the other as an amplitude to synthesize the correction signal S9. However, the polarity of the signal S7 is employed for the selected amplitude. Synthesizing operation of the minimum circuit 4 is as follows.

From time m20 to m22

Since the signal S8 is smaller than the signal S7 and is positive, the signal S8 is selected as the signal S9.

From time m22 to m23

Since the signal S7 is smaller than the signal S8 and is positive, the signal S7 is selected as the signal S9.

From time m23 to m24

Since the absolute value of signal S7 is smaller than that of the signal S8, the signal S7 is still selected as the signal S9.

From time m24 to m29

Since the absolute value of signal S8 is smaller than or equal to that of signal S7 having a negative polarity, the reversed signal S8 is selected as the signal S9.

From time m29 to m31

Since the absolute value of signal S8 is smaller than that of signal S7 both of which polarities are negative, the signal S8 is selected as the signal S9.

From time m31 to m35

Since the absolute value of signal S7 is smaller than that of signal S8, the signal S7 is selected as the signal S9.

From time m35 to m38

Since the absolute value of signal S8 having a negative polarity is smaller than that of signal S7 having a positive polarity, the reversed signal S8 is selected as the signal S9. Thus, the signal S9 has a first portion Fp between time m20 and m26 for the period Ta, a second portion Sp between time m26 and m29 for the period Tb, and a third portion between time m29 and m37 for the period Tc.

The delay circuit 9 delays the video signal S1 by period "t1+t2/2" and produces the delayed video signal S10 as synchronized with the correction signal S9. Therefore, the waveform of the delayed video signal S10 is identical to that of the video signal S1 except that the phase is delayed by "t1+t2/2".

The subtracter 10 subtracts the correction signal S9 from the delayed video signal S10 and produces the output video signal S0. Since the first portion Fp, the second portion Sp and the third portion Tp of the correction signal S9 have the same wavelengths as those of the rising portion A, the plain portion B and the falling portion C of delayed video signal S10", respectively. The negative or positive wave forms at the first portion Fp and the third portion Tp are only used to make large of the inclination of the first portion A and second portion B for sharper outline of the image as in a manner described below.

From time m20 to m22

The amplitude of signal S9 rising from the zero to a first positive peak smaller is subtracted from the signal S10, so that the signal So is plain, as shown.

From time m22 to m23

The amplitude of signal S9 falling down to the zero is used so that the signal S0 starts to rise at the larger gradient than that of the signal S10.

From time m23 to m24

The negative amplitude of signal S9 falling down negative is subtracted from the S10, so that the signal S0 continues to rise as same as before.

From time m24 to m26

The negative amplitude of signal S9 rising to the zero is subtracted from the signal S10, so that the signal S0 stays the risen level. It is to be noted that the period from m20 to m26 is the same as the period Ta of the rising portion A of the video signal S1.

From time m26 to m29

Since the signal S9 is at the zero level, the signal S0 is the same as the signal S10. It is to be noted that the period from time m26 to m27 is the same as the period Tb of the plain portion B of the video signal S1.

From time m29 to m31

The negative amplitude of signal S9 falling down negative is subtracted from the signal S10, so that signal S0 stays at the plain state.

From time m31 to m33

The negative amplitude of signal S9 rising to the zero is subtracted from the signal S10, so that the signal So falls at the larger gradient than that of signal S10.

From time m33 to m35

The positive amplitude of signal S9 rising from the zero is used so that the signal S0 continues to fall down to the zero at the larger gradient.

From time m35 to m38

The positive amplitude of signal S9 falling down to the zero is subtracted from the signal S10, so that the signal S0 stays at the zero level. It is to be noted that the period from time m29 to m37 is the same as the period Tc of the falling portion C of the video signal S3.

The delay circuit 9 delays the video signal S1 by period "t1+t2/2" and produces the delayed video signal S10 as synchronized with the correction signal S9. Therefore, the wave form of the delayed video signal S10 is identical to that of the video signal S1 except that the phase is delayed by "t1+t2/2". It is to be noted that thus produced output video signal S0 has a rising portion A' between time m22 and m28, a plain portion B' between time m28, and a falling portion C' between time m31 and 35. Apparent for the above, the gradient of portions A' and B' are greater than those of the portions A and B of the video signal S1. As described above, The rising portion A' without any of preshoots or overshoots, as shown.

As described the above, the outline enhancing device of the present invention can most effectively enhances the outline of such a video signal in which Ta of the rising portion A or Tc of the falling portion C is greater than t2/2 and the pulse length Ta+Tb+Tc is greater than t1.

According to the outline enhancing device of the present embodiment, it is possible to produce the outline enhancing signal having enhancing portion which wavelengths are the same as those of leading and trailing portion of the video signal by the use of usual electric circuits such as delay circuits, subtracters, and minimum circuits. Thus enhanced output video signal has a leading and a trailing slopes in steep angles without any occurrence of preshoots or overshoots.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An outline enhancing device for enhancing an outline of an image formed by a video signal having first and second slope portions and a flat portion between said first and second slope portions, said first and second slope portions and said flat portion extending for first and second periods and a third period, respectively, comprising:

enhancing signal producing means for producing an enhancing signal having first and second enhancing portions and a non-enhancing portion between said first and second enhancing portions such that said first and second enhancing portions and said non-enhancing portion extend for the same periods as those of said first and second slope portions and said flat portion, respectively;

synchronizing means for synchronizing said video signal with said enhancing signal; and enhancing means for enhancing an outline of said video signal by subtracting said enhancing signal from said video signal, whereby said first and second enhancing portions and said non-enhancing portion are exactly superimposed on said first and second slope portions and said flat portion, respectively, without interference to either of neighboring portions thereof and used for making said first and second slope portions of the enhanced outline steeper than said first and second slope portions of the non-enhanced outline.

2. An outline enhancing device as claimed in claim 1, wherein said enhancing signal producing means comprise:

first delaying means for delaying said video signal by a first predetermined period to produce a first delayed signal, and first predetermined period being predetermined based on said first and second periods;

first subtracting means for subtracting said first delayed signal from said video signal to produce a primary differentiated signal representing a differentiation of said video signal;

second delaying means for delaying said primary differentiated signal by said first predetermined period to produce a delayed primary differentiated signal;

first minimum means for combining either part of said primary differentiated signal and said delayed primary differentiated signal which is smaller than the other to produce a minimum primary differentiated signal;

third delaying means for delaying said minimum primary differentiated signal by a second predetermined period to produce a first delayed minimum primary differentiated signal, said second predetermined period being predetermined based on said first and second periods;

second subtracting means for subtracting said first delayed minimum primary differentiated signal from said minimum primary differentiated signal to produce a second differentiated signal representing a differentiation of said minimum primary differentiated signal;

forth delaying means for delaying said minimum primary differentiated signal by a third predetermined period to produce a second delayed minimum primary differentiated signal, said third predetermined period being a half of said second predetermined period; and second minimum means for combining either part of said second differentiated signal and second delayed minimum primary differentiated signal which is smaller than the other to produce said enhancing signal.

3. An outline enhancing device as claimed in claim 2, wherein said synchronizing means is a delay circuit for delaying said video signal by a total of said first and third predetermined period to produce a delayed video signal.

4. An outline enhancing means as claimed in claim 1, wherein said enhancing means is a subtracter for subtracting said enhancing signal from said delayed video signal.

* * * * *